(12) United States Patent
Casati et al.

(10) Patent No.: US 7,222,334 B2
(45) Date of Patent: May 22, 2007

(54) MODELING TOOL FOR ELECTRONIC SERVICES AND ASSOCIATED METHODS AND BUSINESSES

(75) Inventors: Fabio Casati, Palo Alto, CA (US); Ming-Chien Shan, Saratoga, CA (US); Mehmet Sayal, Sunnyvale, CA (US)

(73) Assignee: Hewlett-Packard Development Comapny, L.P., Houston, TX (US)

( * ) Notice: Subject to any disclaimer, the term of this patent is extended or adjusted under 35 U.S.C. 154(b) by 1030 days.

(21) Appl. No.: 09/911,916

(22) Filed: Jul. 24, 2001

(65) Prior Publication Data

US 2003/0023450 A1 Jan. 30, 2003

(51) Int. Cl.
G06F 9/45 (2006.01)
G06F 9/44 (2006.01)
G06Q 99/00 (2006.01)

(52) U.S. Cl. ................ 717/136; 717/120; 717/121; 717/104; 717/105; 717/140; 705/1

(58) Field of Classification Search .............. 717/136, 717/140, 162–164, 120–121, 104–105; 705/1, 705/5–7, 26; 719/318, 319
See application file for complete search history.

(56) References Cited

OTHER PUBLICATIONS

Casati et al., "eFlow: a Platform for Developing and Managing Composite E-Services", IEEE, Proceedings Academia/Industry Working Conference, pp. 341-348, Apr. 2000.*
Ilnicki et al., "Adaptive and Dynamic Service Composition in eFlow"; HP Labatories Palo Alto; Mar. 2000; pp. 1-20.*
Lamanna et al.; "SLAng: A Language for Defining Service Level Agreements"; Distributed Computing Systems, 2003. FTDCS 2003. Proceedings. The Ninth IEEE Workshop on Future Trends of , May 28-30, 2003; pp. 100-106.*
Piccinelli et al.; "Dynamic e-service composition in DySCo"; Distributed Computing Systems Workshop, 2001 International Conference on , Apr. 16-19, 2001 pp. 88-93.*
Jin et al.; "An Open, Flexible, and Configurable System for Service Composition"; Advanced Issues of E-Commerce and Web-Based Information Systems, 2000. WECWIS 2000. Second International Workshop on , Jun. 8-9, 2000; pp. 125-132.*

(Continued)

*Primary Examiner*—Meng-Ai An
*Assistant Examiner*—William H. Wood

(57) ABSTRACT

An electronic services modeling tool for composite e-services and functionality, where a composite e-service is an e-service defined by composing other basic or composite e-services. Implementation of an e-service for composing e-services into a composite e-service. Characteristics of composite e-services and of their differences with respect to traditional workflow-like composition. Definition of a composition model suitable for e-services. Description of a prototype implementation, showing an approach that can be reused for implementing composition on top of any E-Services Platform. Providing composition functionality as an e-service, to be used not only by the owner of the ESP, but also by any designer-user. A specific type of e-service, meta-service, called Composition E-Service, allows the definition, execution, management, and monitoring of composite e-services. A language used for specifying the composition. Architecture and implementation of the CES to deliver the service on top of an ESP.

28 Claims, 12 Drawing Sheets

OTHER PUBLICATIONS

Griffel et al.; "Electronic Contracting with COSMOS—How to Establish, Negotiate and Execute Electronic Contracts on the Internet";Enterprise Distributed Object Computing Workshop, 1998. EDOC '98. Proceedings. Second International , Nov. 3-5,1998;pp. 46-55.*

Marazakis et al.; "The Aurora Architecture for Developing Network-Centric Applications by Dynamic Composition of Services"; Department of Computer Science, University of Crete and Institute of Computer Science, FORTH; pp. 1-51.*

Stammers et al.; "From E-Processes to E-Networks: an E-Service-oriented approach"; HP; pp. 1-5.*

Web Services Flow Language (WSFL 1.0), IBM Software Group, May 2001.*

Casati et al., "Definition, Execution, Analysis, and Optimization of Composite E-Services", Bulletin of the IEEE Computer Society Technical Committee on Data Engineering, 2001, pp. 1-6.*

Schranz, Markus W. "Engineering Flexible World Wide Web Services", ACM, 1998.*

Zou et al., "Web-Based Specifcation and Integration of Legacy Services", ACM, Nov. 2000.*

Agrawal et al., "Vinci: A Service-Oriented Architecture for Rapid Development of Web Applications", ACM, May 1-5, 2001, pp. 355-365.*

Karp, Alen H. "E-speak E-xplained", Hewlett-Packard Laboratories Palo Alto, CA, Jul. 27, 2000, pp. 1-18.*

Graupner et al., "E-Speak—an Enabling Infrastructure for Web-based E-Services", International Conference on Advances in Infrastructure for Electronic Business, Science, and Ediucation on the Internet, 2000.*

Casati et al., Process Automation as the Foundation for E-Business, Proceedings of the 26th International Converence on Very Large Databases, Cairo, Egypt, 2000.

Staffware PLC, Staffware 2000 Functional Overview, copr. 1998, pp. 1-21.

Georgakopoulos, et al., An Overview of Workflow Management: From Process Modeling to Workflow Automation Infrastructure, Kluwer Academic Publ., Boston, MA, 1995, pp. 119-153.

Benatallah et al., Composing and Maintaining Web-based Virtual Enterprises, undated, pp. 1-20.

Georgakopoulos, et al., Process-based E-Service Integration, undated, MCC 3500 W. Balcones Center Dr., Austin TX, pp. 1-18.

Casati et al., An Open, Flexible, and Configurable System for Service Composition, submitted for publication, Jun. 2001 (8pp., unnumbered).

* cited by examiner

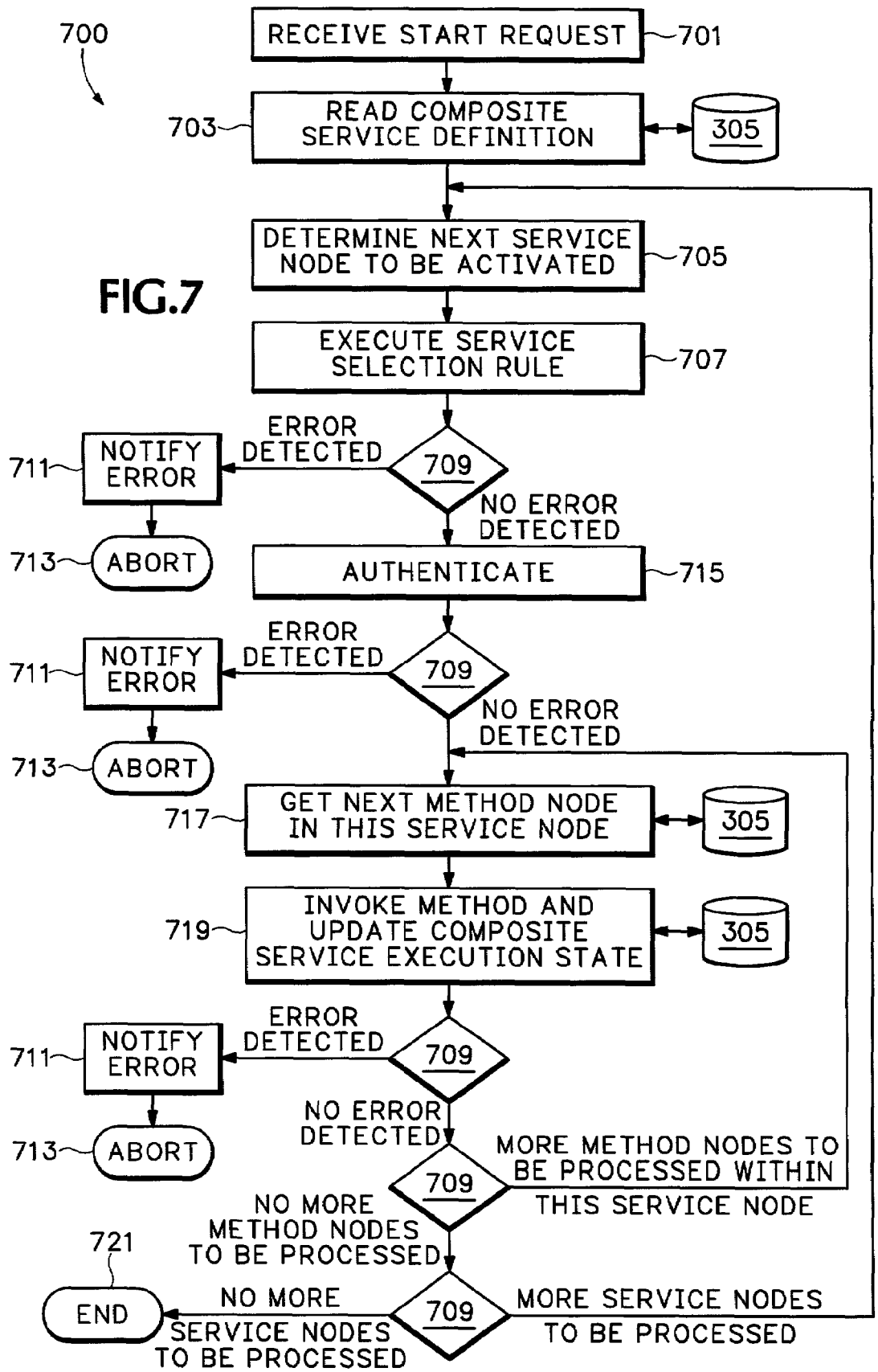

MODELING TOOL FOR ELECTRONIC SERVICES AND ASSOCIATED METHODS AND BUSINESSES

CROSS-REFERENCE TO RELATED APPLICATIONS

This application is related to U.S. patent application Ser. No. 09/911,980, filed Jul. 24, 2001, entitled "Modeling Tool For Electronic Services And Associated Methods" by the same inventors.

STATEMENT REGARDING FEDERALLY SPONSORED RESEARCH OR DEVELOPMENT

None.

REFERENCE TO AN APPENDIX

This application includes a hard copy Appendix comprising an exemplary code listing for a novel COMPOSITE SERVICE DEFINITION LANGUAGE, "CSDL."

BACKGROUND OF THE INVENTION

1. Field of the Invention

The present invention relates generally to electronic-commerce and electronic-services and, more particularly, to a modeling tool for development of electronic-services, methodologies related to the tool, uses of the tool, and an electronic-service employing the tool.

2. Description of the Related Art

In the state of the art, the Internet is not only being used to provide information and perform electronic commercial business transactions ((business-to-business and customer/client-to-business; hereinafter "e-commerce"), but also as a platform, or set of discrete platforms, through which services and products are delivered to businesses and customers. (Depending on the context, "Internet" or "internet" is used herein as both a specific and generic term for any collection of distributed, interconnected networks (ARPANET, DARPANET, World Wide Web, or the like) that are linked together by a set of industry standard protocols (e.g., TCP/IP, HTTP, UDP, and the like) to form a global, or otherwise distributed, network.) The recent development of large numbers and types of electronic-services (hereinafter "e-service(s)" or "ES"), as well as of electronic-service providers, sets out a need for mechanisms and frameworks that support providers in developing and delivering e-service and support consumers in finding and accessing those e-commerce businesses and any related physical business outlets. Thus, software vendors and industry consortia are providing models, languages, and tools for describing e-services and making them available to users. Such tools and frameworks usually allow the specification of specific e-services in terms of their inherent properties, which can be generic (such as the electronic-service name and location, e.g., fictitious Acme Cars) or service item specific (such as the car size for a car rental service). Depending on the framework, the properties are generally represented by Java vectors or XML documents. In addition, software vendors provide software platforms ("E-Service Platform," or simply "ESP") that allow service providers to register and advertise their services and allow authorized users to lookup and access registered electronic-services.

FIG. 1 (Prior Art) is a schematic representation of such a ESP system. Examples of commercially available platforms are BEA Web Logic Collaborate™, WebMethods Enterprise™, Sun Microsystems Jini™, IBM WebSphere™, and present assignee Hewlett-Packard Company's HP™ e-speak™ ESPs 100 (further details being available at http://www.e-speak.hp.com). Ovals 103 labeled "ES" represent specific E-Service(s) 103. An exemplary Service Provider 105, such as a public transportation related corporation, may register a plurality of generic services: buying cars, renting cars, selling cars, van or bus services, limousine services, and the like, each being a specific individual E-Service 103. An E-Service Platform 100 itself may be coupled to other platforms 101 for subsidiary or specialized E-Service(s) 103, such as those which are internal operations of the E-Service Platform related business itself. This platform approach enables the uniform representation, search, and access of business applications, both those used for internal operations (such as access to databases or other enterprise applications and the like as would be known in the art) and the ones that are made available to customers, Client 107, typically via the Internet at an Internet address. ESPs 100, 101 typically allow Service Providers 105 to register specific electronic-services, each represented as an ES 103 oval symbol, and allow authorized Clients 107 to lookup and invoke registered electronic-services. In order to make electronic-services searchable and accessible to customers, Service Providers 105 (or other user in the case of a sub-platform 101) must register each service definition with an ESP 100, 101 (and possibly with other advertising services (not shown)). As part of the registration process, the Service Provider 105 gives information about each electronic service, such as the service name, the methods (operations) that can be performed on the service along with their input/output parameters, the list of authorized users, and the like. Note that an electronic-service may provide several methods (operations) to be invoked as part of its internet interface; for instance, an e-music service may allow users to browse or search the catalog, to listen to songs, or to buy discs or downloadable mp3 files. In addition, a Service Provider 105 specifies who is the handler of the service, i.e., the application or server that must be contacted in order to request actual service executions. ("Client"-"Browser", "Server" terms are used as the standard model of interaction in a distributed computer network system in which a program at one site sends a request to another site and then waits for a response. The requesting program is called the "client," or "browser" and the program which responds to the request is called the "server.") Depending on the service model and the ESP 100, 101, the service handler can be identified by providing a linking Universal Resource Indicator ("URI")—such as in HP e-speak form—or by giving a proxy Java object that will take care of contacting the handler—such as in Jini.

Customers 107 may look for available electronic-services by issuing service selection queries that may simply search electronic-services by name or that can include complex constraints on the service properties as well as ranking criteria in case multiple electronic-services satisfy the search criteria (e.g., not just Acme Car Rentals (fictitious) but Acme Car Rentals, midsize, San Jose airport, this Saturday night. Service selection queries return a reference to one or more electronic-services that can be used to invoke them.

The uniform representation and implementation of applications according to a homogeneous e-service framework creates a need for methods, devices, and tools for composing individual, web-accessible E-Service (possibly offered by different provider companies) into pre-packaged, value added, "composite e-service," where a composite e-service service is a service composed of more than one individual service and inherent methods thereof. For instance, a provider 105 having an appropriate tool could offer a travel reservation service by composing hotel and flight reservation services, or it could offer an itinerary planning service by composing road map services, weather services, traffic prediction services, and "utility" services to collect data from the user via the web or to send e-mail notifications.

One current approach to structuring work item processes is generally referred to as "traditional subprocess" coding. Each individual context of the process has to be maintained in ad-hoc ways by the process developer, who has to define ad-hoc variables for this purpose. Explicit nodes of a flow diagram for such a one-level processing architecture must be included in the process definition just for the sake of searching subprocesses to interact with. For complex services, process/subprocess coding is extremely complex and necessarily proprietary to the specific service for which it was developed. Upgrading and maintenance requires specific knowledge and understanding of the specific program.

Another current approach to providing a composition facility, advocated by workflow and Enterprise Application Integration ("EAI") vendors, consists in offering a development environment targeted mainly to the enterprise's information technology ("IT") personnel. Basically, in another one-level modeling structure, a service provider specifies the flow of service invocations (i.e., the electronic-services to be invoked, their input and output data specification, and their execution dependencies). A workflow developer specifies the flow of the work, i.e., the work items to be executed (where a work item represents the invocation of a business function and is a black box from the workflow viewpoint), their input and output data specifications, and their execution dependencies. Exemplary traditional workflow management systems such as MQ Workflow (IBM. MQ Series Workflow—Concepts and Architectures (1998)), InConcert (Ronni T. Marshak. InConcert Workflow. Workgroup Computing report, Vol. 20, No. 3, Patricia Seybold Group (1997)), or Staffware2000 (Staffware Corporation, Staffware2000 White Paper (1999)), nor among newly developed, open, XML—and web-based systems such as Forte' Fusion (J. Mann. Forte' Fusion. Patricia Seybold Group report (1999)) and KeyFlow (Keyflow Corp. Workflow Server and Workflow Designer (1999)), are commercially available. Packaged Workflow Management System (WfMS) and problems associated therewith in contrast to the present invention are discussed hereinafter.

The problem issues are similar to proprietary process/subprocess coding. To complicate matters even further, in the e-service virtual world, an E-Service 103 may have several states and several state transitions caused by any individual interaction.

As shown in FIG. 1A (Prior Art), to describe a simple generic interaction flow 111 in an ad-hoc manner results in a complex, tangled spaghetti-like, workflow (even without showing in this simple example all of the subprocesses which are involved within each process node 113 and decision node 115 (and showing only successful decision flow paths)). Such one-level workflows are difficult to design and maintain. Alternatively, one must do hard-coding of the flow logic.

It has been discovered by the present inventors that at a generic level an E-Service 103 access requires: (1) operations to be performed at the service level (e.g., search, authentication, service-level exceptions, and the like) and (2) operations to be performed at the interaction, or method invocation, level (e.g., the invocation of the method and the handling of method-level exceptions, and the like). Although composite electronic-services could be developed by hard-coding the business logic using some programming language, Service Providers 105 would greatly benefit from a composition tool that could ease the tasks of (1) composing E-Services, (2) managing and monitoring them, and (3) making them available to authorized service provider users. In addition to such a tool, there is also need for an approach that consists in providing composition functionality as an e-service itself (or, rather, a meta-service, since it is a service for developing electronic-services); moreover, by providing a new e-service composition functionality as an e-service itself, the service composition facility can be advertised, discovered, delivered, managed, and protected by end-to-end security analogously to any other e-service, thereby exploiting all the advantages and features provided by the ESP 100. In addition, the ability of defining and deploying composite electronic-services is not limited to the ESP 100's owner, but can be offered to other providers, businesses and customers, thereby relieving them from the need of maintaining a composition system that may be onerous to buy, install, and operate. Hereinafter this meta-service e-service is referred to as Composition E-Service, or simply "CES."

There is a need for the design, architecture, and implementation of a composition tools, models, and e-services for developing composite e-services.

BRIEF SUMMARY OF THE INVENTION

The present invention provides a composition model, and associated tools and services, for e-services.

In its basic aspect, the present invention provides an electronic metaservice methodology including: receiving a process definition; transforming the process definition into a composite process specification having a plurality of electronic services; and registering the composite process specification with at least one electronic service.

Another aspect of the present invention is a method of doing an electronic service business via an electronic services platform 100, the method including: registering with said platform a primary electronic service for composing a practical electronic service system from a generic definition thereof; via said primary electronic service, receiving said generic definition; compiling second electronic services registered with said platform into a composite electronic service; and providing said composite electronic service as said electronic service system.

Still another aspect of the present invention is a computerized system for creating composite electronic services for an electronic service platform including: computer code for receiving a process definition; computer code for transforming the process definition into a composite process specification having a plurality of electronic services; and computer code for registering the composite process specification with at least one electronic services platform.

In another aspect, the present invention provides an electronic business system for an electronic services platform environment, the business including: means for receiving a specification of a first electronic service; means for compiling other existing secondary electronic services into the first electronic service; and means for registering said first electronic service in the electronic services platform environment.

The foregoing summary is not intended to be an inclusive list of all the aspects, objects, advantages, and features of the present invention nor should any limitation on the scope of the invention be implied therefrom. This Summary is provided in accordance with the mandate of 37 C.F.R. 1.73 and M.P.E.P. 608.01(d) merely to apprise the public, and more ESP 100ecially those interested in the particular art to which the invention relates, of the nature of the invention in order to be of assistance in aiding ready understanding of the patent in future searches. Objects, features and advantages of the present invention will become apparent upon consideration of the following explanation and the accompanying drawings, in which like reference designations represent like features throughout the drawings.

BRIEF DESCRIPTION OF THE DRAWINGS

FIG. 7 is a flow chart of a Composition E-Service run-time process in accordance with the present invention as shown in FIGS. 2 and 3.

The drawings referred to in this specification should be understood as not being drawn to scale except if specifically annotated.

DETAILED DESCRIPTION OF THE INVENTION

Reference is made now in detail to a specific embodiment of the present invention, which illustrates the best mode presently contemplated by the inventors for practicing the invention. Alternative embodiments are also briefly described as applicable. Subtitles used hereinafter are for reference only; no limitation on the scope or aspects of the invention is intended nor should any be implied therefrom.

Modeling Tool for the Composition E-Service (CES).

Figure 2:
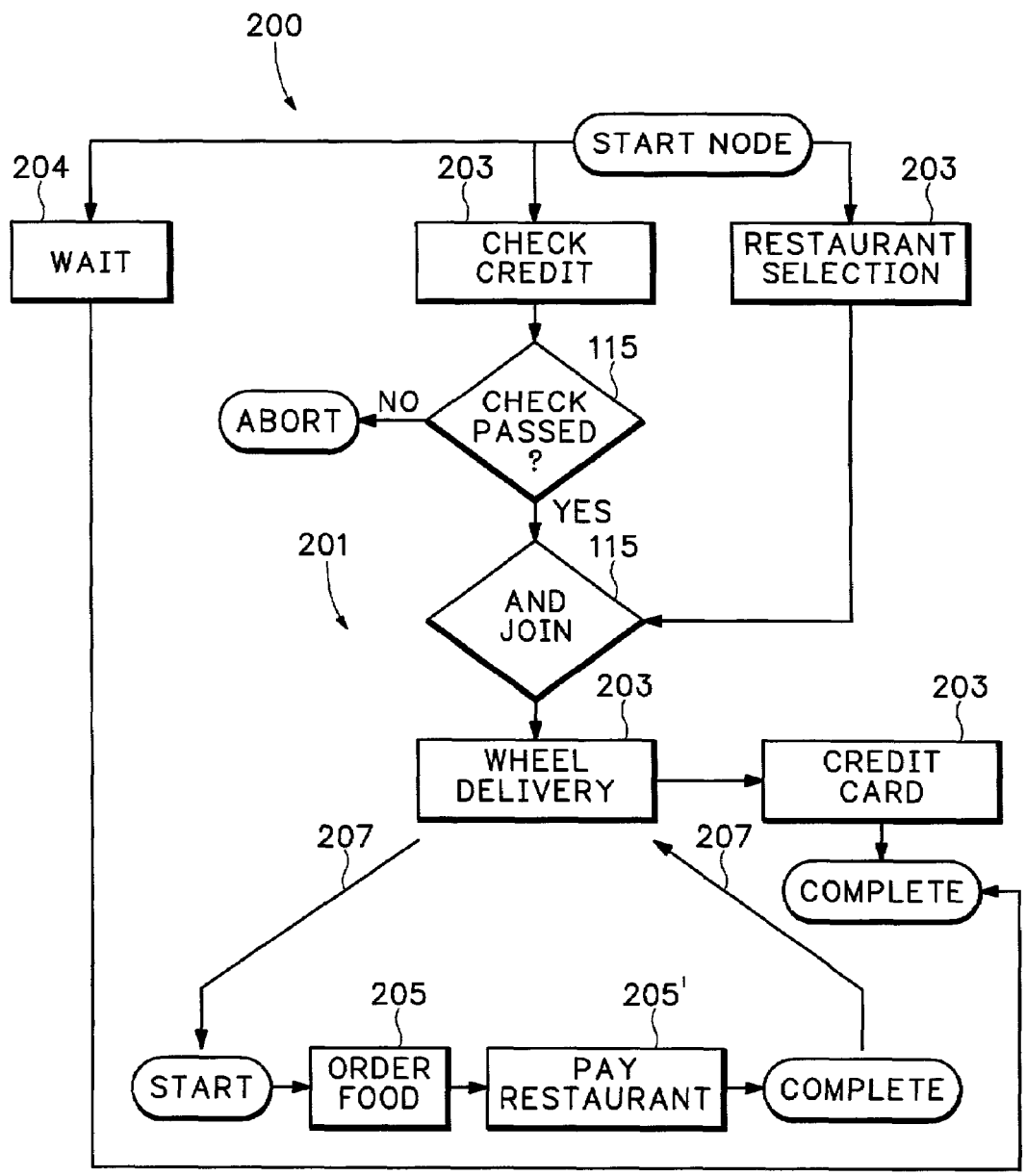
FIG. 2 is an exemplary embodiment of a two-level service composition model in accordance with the present invention.

The present invention provides a two-level process modeling-tool 200 (also referred to herein as simply the "model" or the "tool") as exemplified by FIG. 2. The tool is useful to the Service Provider 105, or service provider's IT personnel, or any composite service provider-designer; hereinafter referred to more simply and generically as the "provider-designer 105."

At a model top-level 201, a composite service (the example is for food ordering, delivery, and payment) is specified by a flow of service nodes 203 each representing the usage of a particular E-Service (e.g., the E-Services 103 (FIG. 1)). The specification, or definition, of a service node 203 includes service-level properties such as:

(1) search recipes, also referred to as service selection rules,
(2) authentication,
(3) certification,
(4) service-level exception handling rules, and where required,
(5) the definition of the interaction flow itself, defining how the interaction with the service is conducted, forming a second, or lower-level 207 of the two-level architecture model. Each single interaction at the model lower-level 207 is modeled by interaction, or method, nodes 205, 205' which are invoked from the lower-level 207. Method nodes 205, 205' are executed in the context of a given E-Service 200. Method nodes 205, 205' 205 can specify:

(1) the service operation to call, i.e., a specific method to be invoked,
(2) input data format,
(3) output data format and handling, and
(4) interaction-level exception handling rules.

Note that this tool has exception-handling behaviors provided for at both levels, segregating service exception handling and interaction exception handling.

In other words, service nodes 203 of the top-level 201 define the highest level definition of a service on which methods or operations of the lower level 207 can be and generally are invoked and performed. Service nodes 203 define the service invocation setup phase (e.g., search for the best service provider, authenticate, and the like) and method nodes 205, 205' 205 define the interaction phase, invoking actual physical operations (e.g., delivering goods, receiving payments, and the like). Having two different levels 201, 207 and two different kinds of nodes 203, 205 provides a tool which simplifies the service composition effort since it allows the definition of a context—the service—in which interactions are performed. This simplification is illustrated by comparing FIG. 2 with FIG. 1A (Prior Art), illustrating that the tendency toward the complex spaghetti-like workflow of the prior art is eliminated. The model thus provides for the design of composite electronic-services by being able to compose more basic ones, making it easier to design composite electronic-services, to maintain composite service definitions, and to manage authentication and exceptions at the appropriate level of abstraction.

At the top level 200, the CES graphical construct may include service, decision, and event nodes. In FIG. 2, square boxes represent service nodes 203 while diamonds represent decision-route nodes 115. Service nodes 203 represent invocations of both basic e-services or composite electronic-services; decision-route nodes 115 specify the alternatives and rules controlling the execution flow; and, event nodes 204 (an "event node" is generic for a predetermined system event such as "'WAIT' for customer cancellation;" an event node enables composite electronic-services to send and receive several types of notifications (in this example, if the operation receives a "cancel order" it thus leads to a process "complete" node.) A composite service instance is an enactment of a composite service. The same composite service may be re-instituted several times, and several instances may be concurrently running. For example, customers could be concurrently using a "food delivery" composite e-service.

Figure 3:
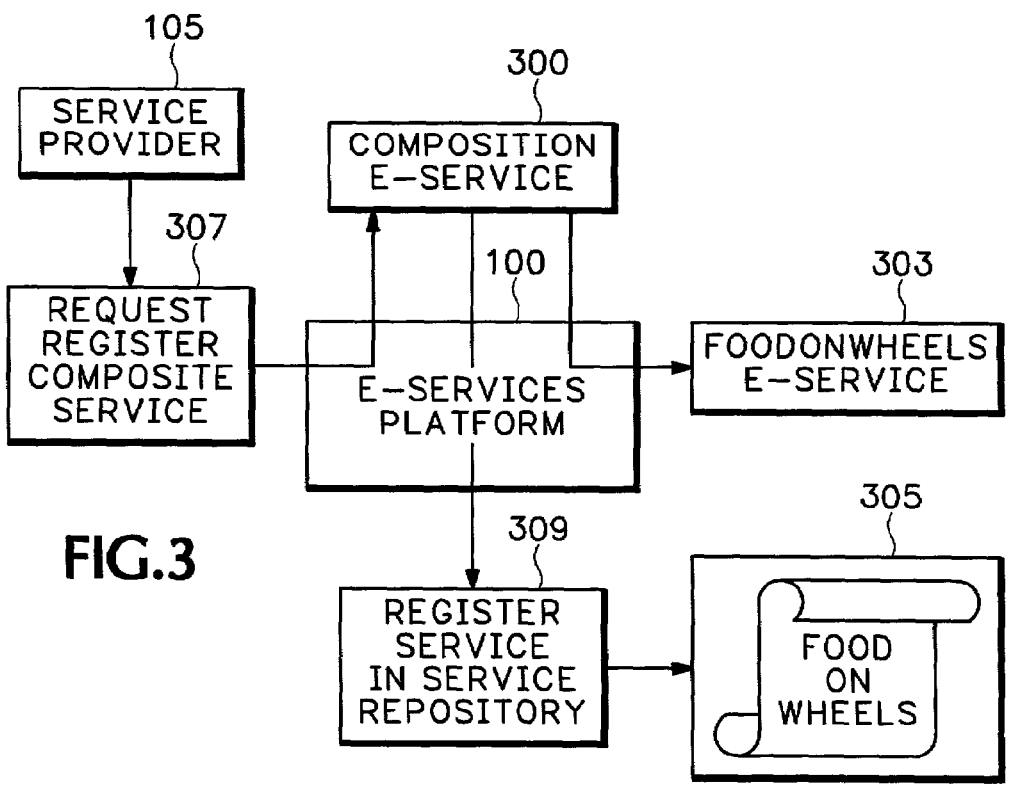
FIG. 3 is a generic block diagram representative of a Composition E-Service model in accordance with the present invention, referencing the exemplary model as shown in FIG. 2.

Look also to FIG. 3, as an exemplary embodiment, a FoodOnWheels E-Service 303 advertises that it delivers any kind of food to a customer's door. FoodOnWheels 303 receives order from a customer and, if the customer has a valid credit card—i.e., "Check credit" labeled service node 203—FoodOnWheels 303 selects one or more restaurants that can provide the requested food (unless the customer specifies a preference) by accessing a restaurant selection service—i.e., "Restaurant selection" service node 203. Then, FoodOnWheels 303 picks up the food at the restaurant(s) and delivers it to the customer at the requested time, through a food delivery service—i.e., "Wheel delivery" labeled service node 203. Note that Wheel delivery shows a lower level 207 method flow (FIG. 2, only). Next, the customer's credit card is charged, by invoking a credit card payment service—i.e., "Credit card" labeled service node 203.

Thus, in one basic aspect, the present invention is a modeling tool for constructing composite-services, segregating services and methods into a two-level architecture.

Composition E-Service (CES) Tool

As illustrated in FIG. 3, CES 300 is a higher level abstraction imposed onto an E-Service Platform 100. In general it allows any user, viz., provider-designer 105 to:
(1) Register and advertise definitions of composite electronic-services with the ESP 100 and make them available to authorized Clients 107 just like any other e-service (see FIG. 1);
(2) invoke (start executions of) composite electronic-services (the CES 300 will execute the service on behalf of the user by appropriately invoking the component electronic-services as defined by the CSDL specifications); and
(3) manage composite electronic-services: the CES 300 allows the modification or deletion of composite service definitions as well as running instances;
(4) monitor composite electronic-services: the CES 300 allows customers and Service Providers 105 to monitor/track the execution of on-going instances as well as completed composite service executions.

CES 300 is not linked to a specific service composition language. It is a generic component and in principle can accept definitions provided in any known process flow language that composes e-services. Note that the present invention also includes a specific Composite Service Description Language (CSDL) for defining composite E-Services 103; CSDL features described in detail hereinafter.

Figure 4:
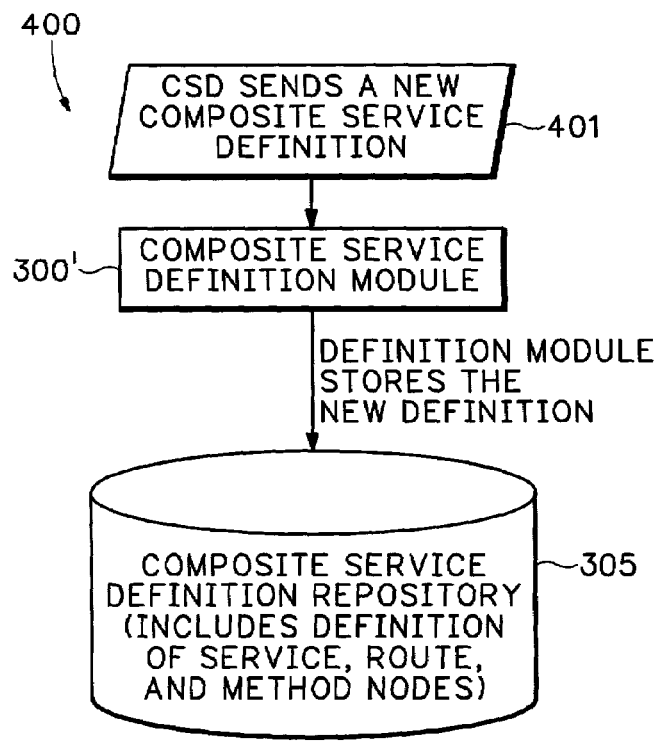
FIG. 4 is a generic block diagram representative a Composition E-Service compilation architecture in accordance with the present invention as shown in FIGS. 2 and 3.

More specifically, FIG. 4 illustrates the CES-based e-service registration system architecture 400 and generalized methodology flow for a composite E-Service 200. (Simultaneous reference to FIG. 3 will aid in understanding.) In order to register a composite service, a composite service provider-designer 105 must give the same information needed to register a basic e-service to the CES 300 (except for the service handler), so that the composite E-Service 200 can be registered and made available to authorized users. In addition, the Service Provider 105 IT personnel, or composite service designer, gives the specifications 401 (CSDL-based) to the CES's "Composite service definition module" 300' to define how electronic-services should be composed.

For example, FIG. 3 shows the composite service registration process for a composite E-Service 303 (analogous to ES 200, FIG. 2) called FoodOnWheels (described in more detail below). Such a provider-designer 105 who wants to define a new composite service invokes the register method of the CES by sending a packet 307 of the service description (service information plus CSDL flow) as a parameter. The CES 300 then registers 309 the composite service with the ESP 100 in order to make it available as a specific E-Service 303 for other authorized customers, e.g., Client 107. The registration with the ESP 100 is analogous to any other service registrations, and therefore the CES 300 must provide all the required information describing the E-Service and restricting access to it, placing it in an appropriate service repository, storage memory, 305. In particular, the registration 309 should also specify who is the handler for the e-service.

Composition E-Service Behavior and Use

Figure 6:
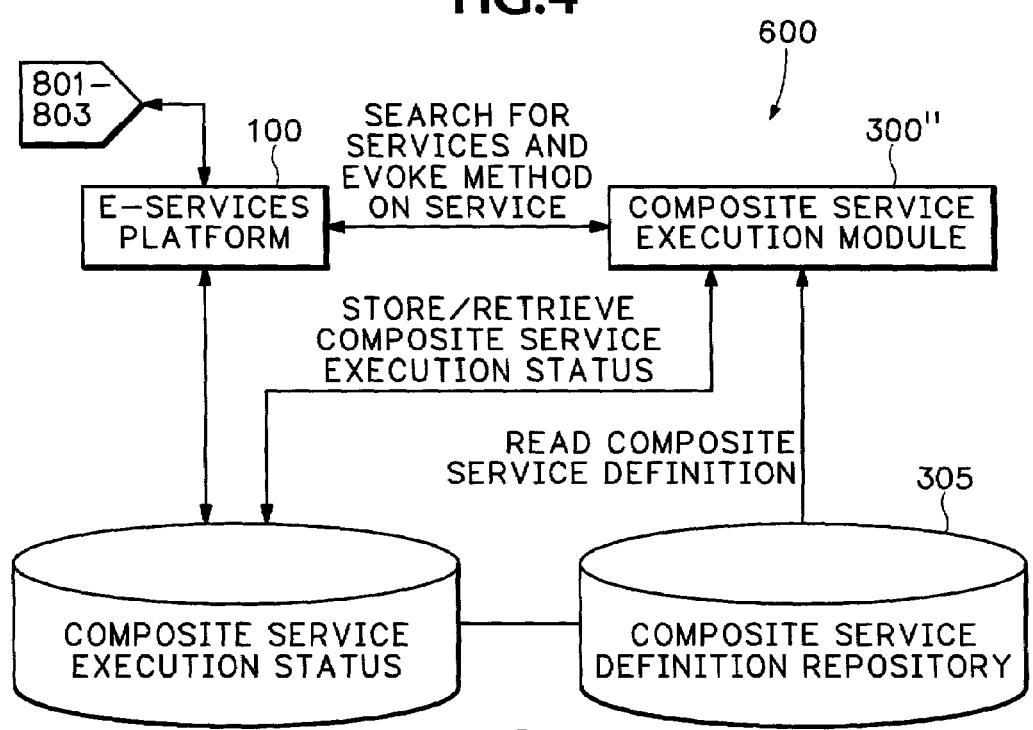
FIG. 6 is a generic block diagram representative a Composition E-Service run-time architecture in accordance with the present invention as shown in FIGS. 2 and 3.
Figure 8:
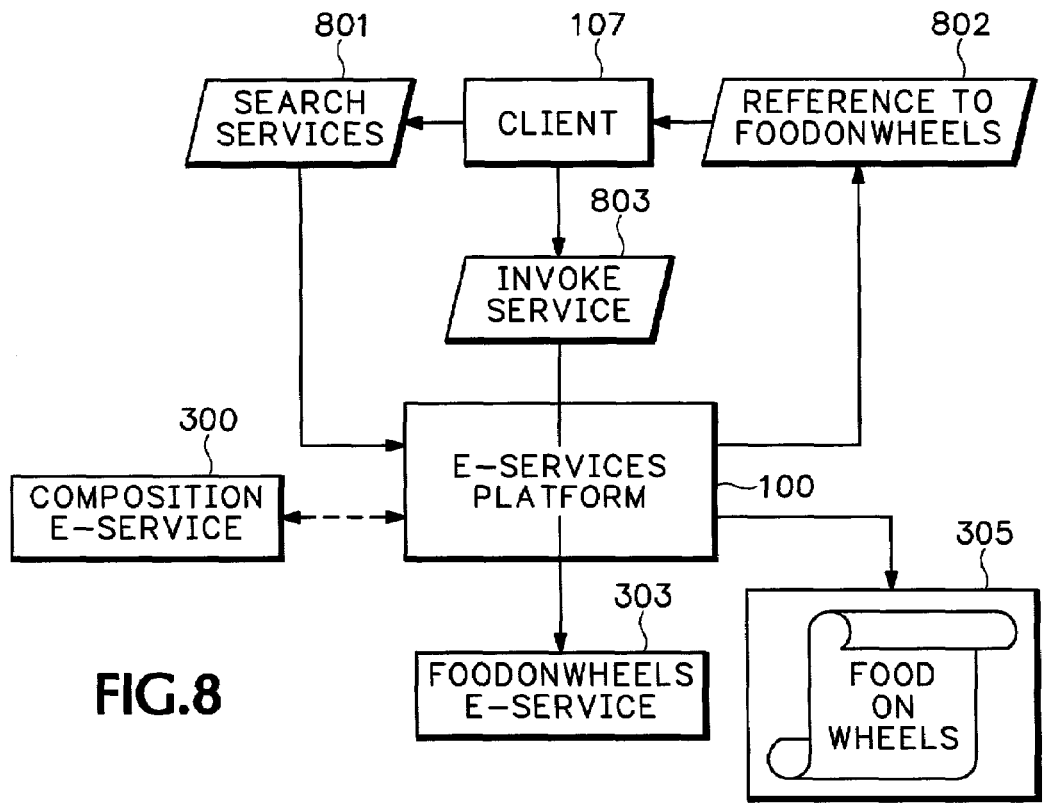
FIG. 8 is a block diagram exemplifying a client use of a Composition E-Service as shown in FIGS. 2, 3, 6 and 7.

As shown in FIGS. 6 and 7, the run-time, or execution, architecture 600 and flow 700 of the CES 300 is illustrated. FIG. 8 depicts a Client 107 that needs an ES for food delivery. When a Client 107 needs a food delivery service, it queries 801 the ESP 100, and thus the ESP 100 repository 305, to find out which electronic-services are available and appropriate to the search terms. The Client 107 may ask the ESP 100 to rank the electronic-services according to the specified criteria and return the best one. If the best service happens to be FoodOnWheels 300, then a reference to this service is returned 802. As for any other service, the Client 107 can then query the service description stored in the repository 305 and perform 803 method invocations on this service. Note that the process is transparent; the Client 107 has no knowledge that the service is in fact an execution of a composition service of the CES 300 (demonstrated by the dashed line connecting CES 300 to ESP 100). Being a composite service, Food On Wheels is executed by the CES. Note also that in other embodiments, the composite service may be actually executed by some other entity, possibly created by the CES or another composite service definition.

Turning back also to FIGS. 6 and 7, a composite service execution module 300" of the CES 300 receives the request to start a composite service operation, step 701. Access to the composite services repository 305 provides the definition of the composite service to be executed, step 703. Based on the composite service definition, a determination of the next service node 203 to be activated is rendered, step 705. In accordance with the composite service definition, the current node's service selection rule is executed, step 707. If the execution of the current service node 203's service selection rule returns an error, decision-route node 709, a notification of an error is dispatched, step 711, and the operation aborted, step 713. Assuming no error occurs, authentication is performed, step 715. Assuming authentication is verified, the current service node 203's method nodes 205, 205' are similarly executed, steps 717, 719. Once all top-level service nodes 203 and lower-level method nodes 205, 205' are successfully navigated by the CES 300, the composite service execution is completed and the results are returned 802 to the Client 107, e.g., a confirmation of the food order and payment.

Composition E-Service Tool Functions

Figure 9:
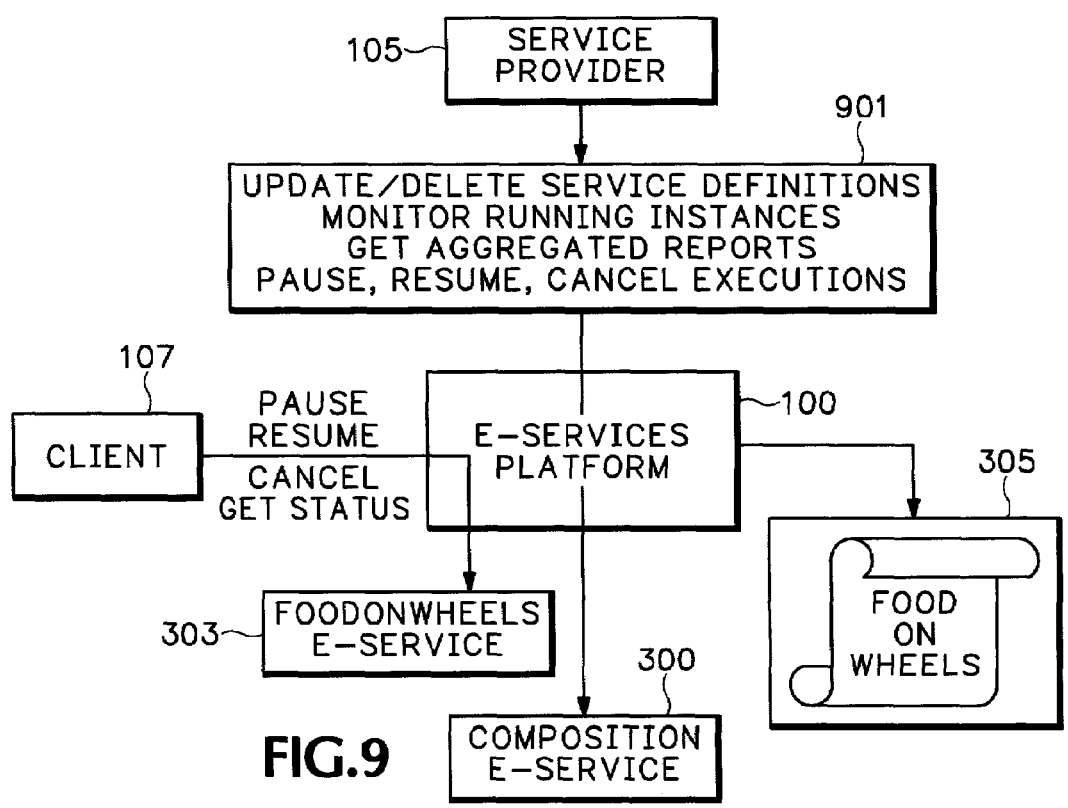
FIG. 9 is a block diagram exemplifying provider-provider-designer 105 uses of a Composition E-Service as shown in FIGS. 2, 3, 4, and 5.

Turning to FIG. 9, the provider-designer 105 is provided with ancillary generic functions 901—in the art these are sometimes referred to as "primitives"—for changing and managing e-service definitions, monitoring run-time executions, obtaining analytical-statistical reports, and the like as may be pertinent to any particular implementation. This FIGURE demonstrates what happens logically as the FoodOnWheels 303 composite electronic service is not a separate entity per se; the CES 300 offers the primitives transparently to the Client 107.

Figure 10:
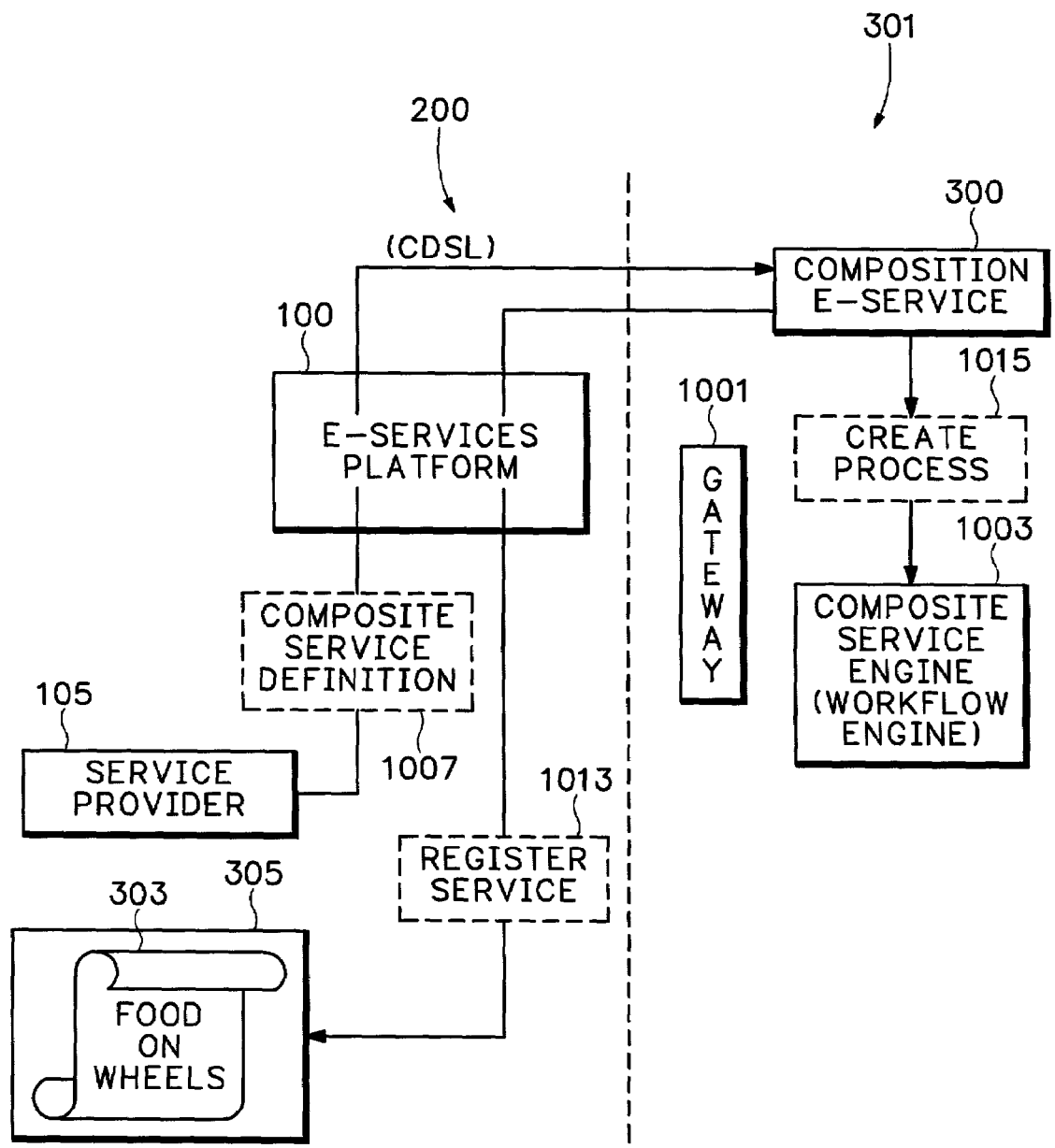
FIG. 10 is a block diagram of components of a Composition E-Service prototype in accordance with the present invention.
Figure 10A:
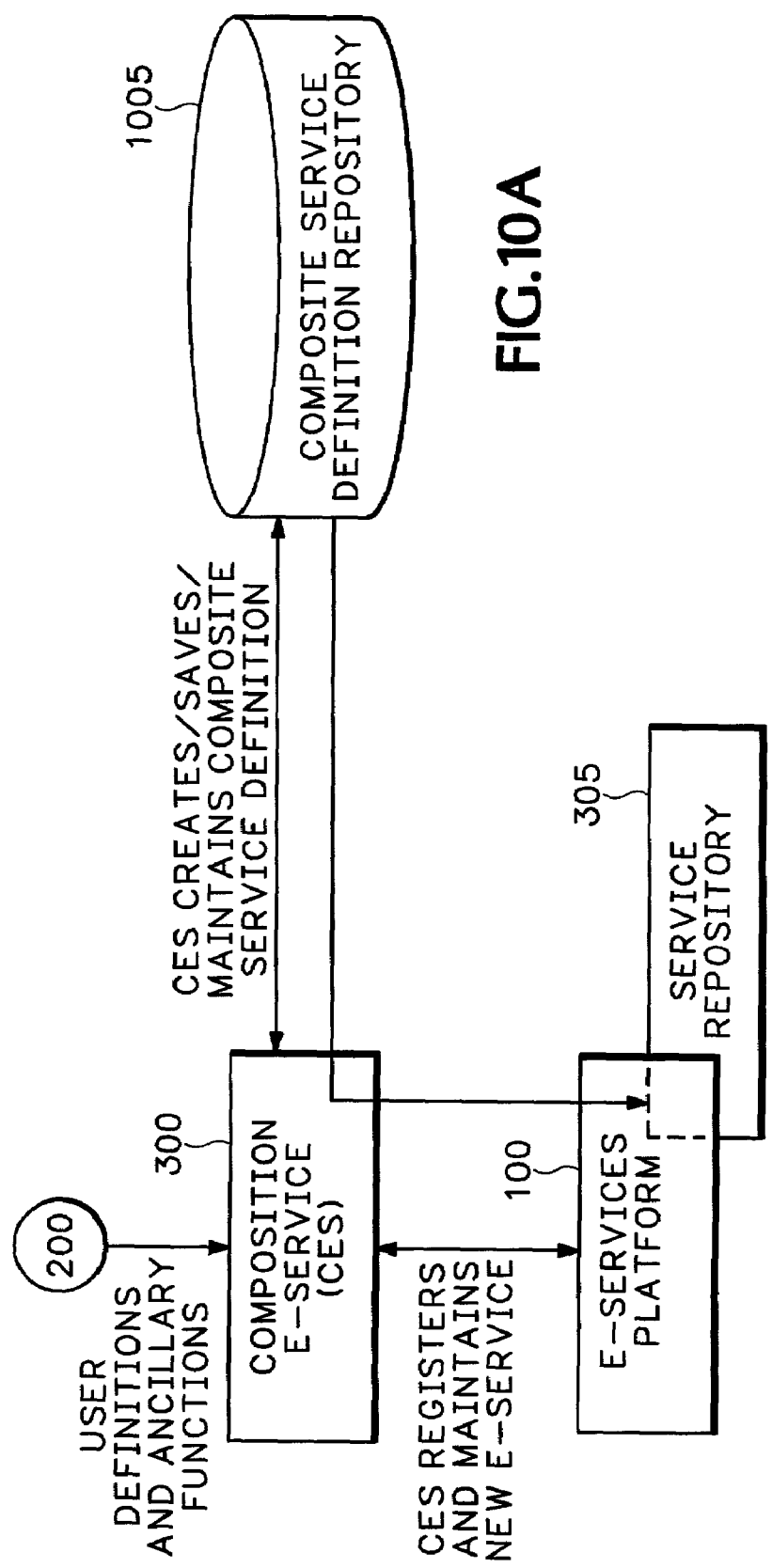
FIG. 10A is a block diagram of the architecture for registering composite e-services in accordance with the present invention as shown in FIG. 10.
Figure 10B:
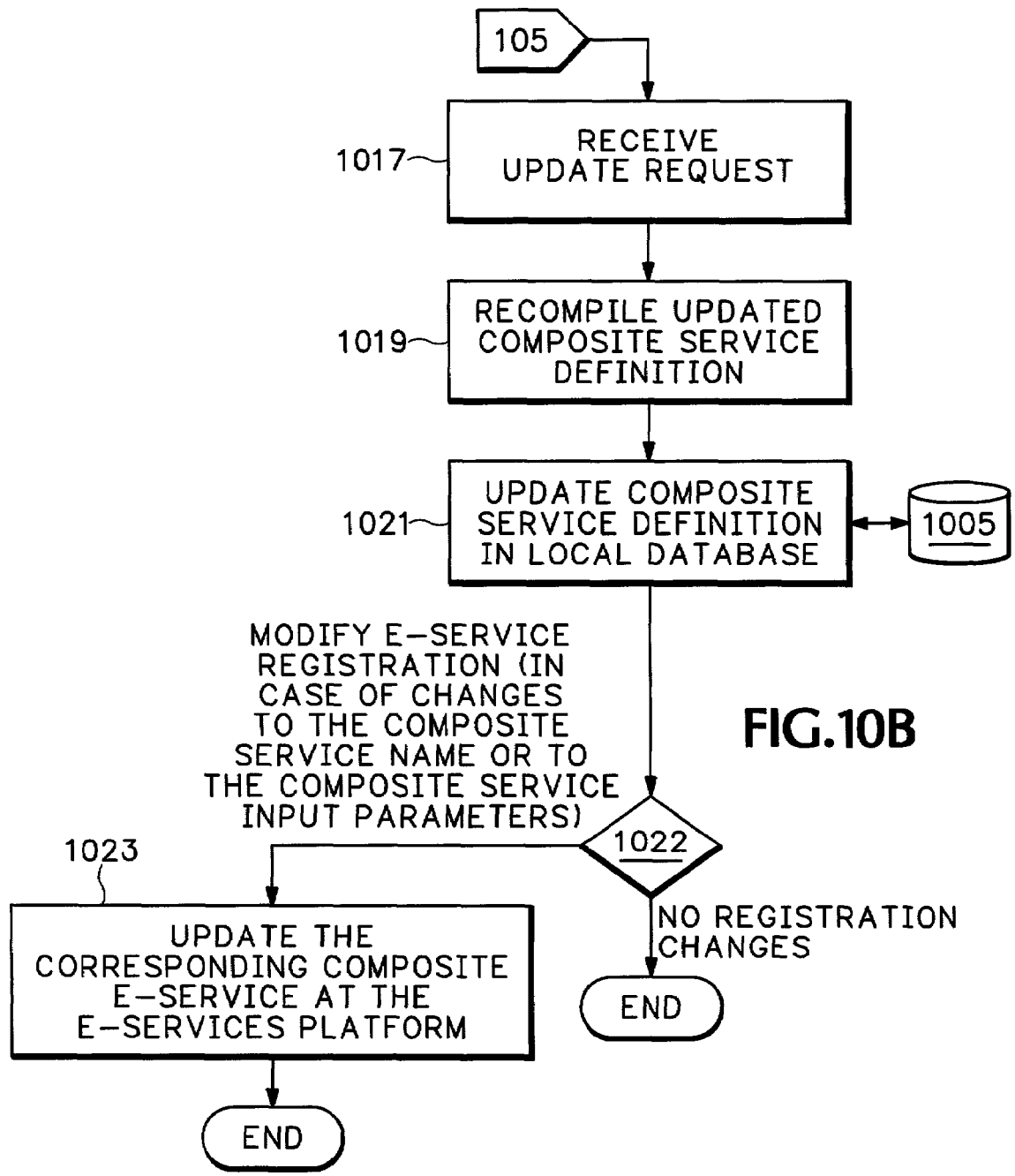
FIG. 10B is a flow chart of the method of updating composite e-services in accordance with the present invention as shown in FIG. 10.
Figure 10C:
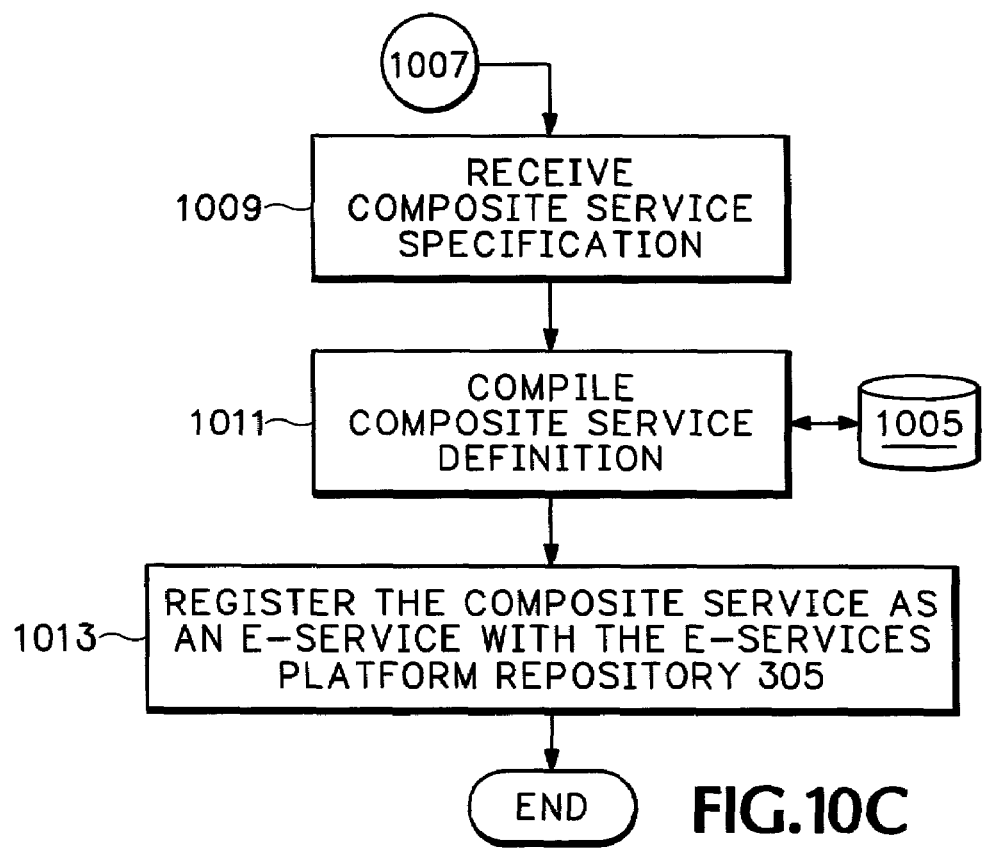
FIG. 10C is a flow chart of the method for registering composite e-services in accordance with the present invention as shown in FIG. 10.
Figure 10D:
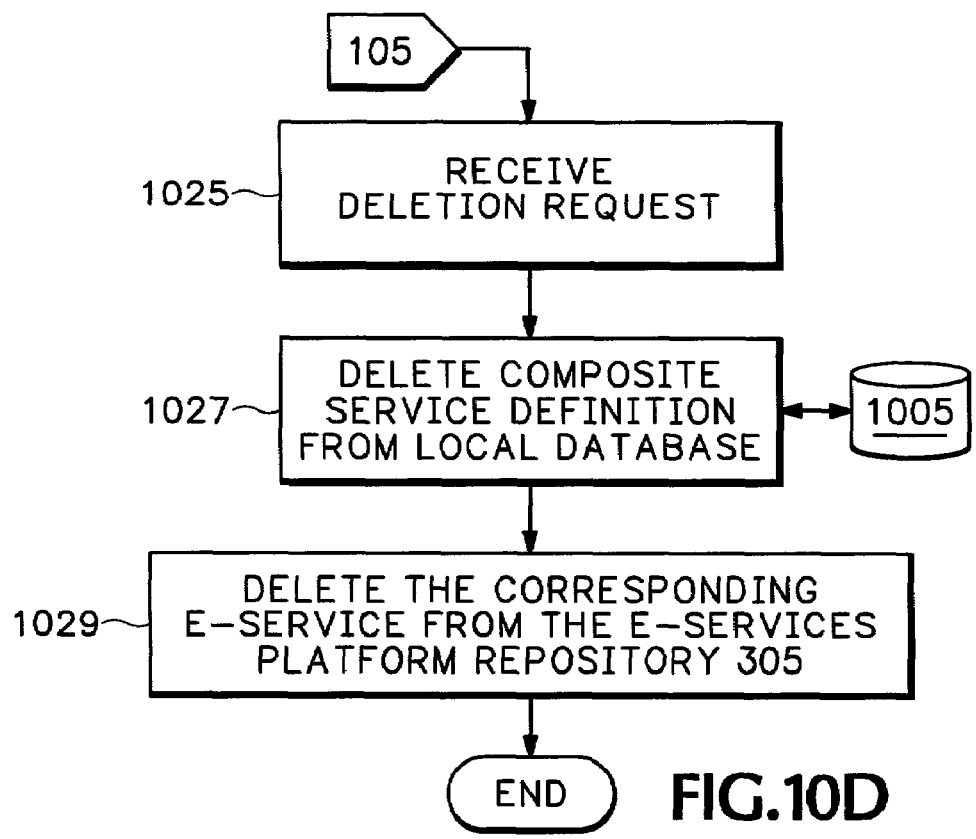
FIG. 10D is a flow chart of the method for deleting composite e-services in accordance with the present invention as shown in FIG. 10.

Note that in the preferred embodiment, the definitions of composite services are "owned" by the CES 300 as demonstrated by the model architecture of FIG. 10A (FIG. 10A also relating to maintenance (see also FIG. 10B-10D of an already registered service). Note that the architecture of FIG. 10A shows that the CES 300 is essentially in control of all the main functions including receiving composite service definitions, creating composite service definitions if so requested by a Service Provider 105 (viz., the meta-service described above and in more detail hereinafter), saving composite service definitions in a definition repository 1005, maintaining each composite service definition, providing monitoring feedback to the Provider, and, in one embodiment, of executing the service.

Registration

As shown in FIGS. 10A and 10C, the provider-designer 105 can send 1007 a pre-composed composite e-service definition 200 to the CES. The CES 300 receives, step 1009 the CSDL definition 200, compiles it, step 1011, and registers 1013 it (shown again as exemplary e-service "FoodOnWheels" 303) with the ESP 100. In the alternative, providing the metaservice, the CES 300 itself can create 1015 the composite e-services definition from a generic description provided (in any composition language), compile it, and register it. Note that the CES is used as a metaservice, i.e., a service for creating e-services, regardless of whether it is compiled in CSDL or another composition language.

Updates/Deletions

A provider-designer 105 can update or delete an e-service definition via the CES 300, resulting in a corresponding update or deletion of the service registration on the ESP 100. These functions are illustrated by FIGS. 10B and 10D, respectively.

The updating function starts, as depicted in FIG. 10B, when a request for changes is received 1017 by the CES 300 from the provider-designer 105. The CES recompiles 1019 an updated composite service definition, storing the updated version in the CES service definition repository 1005. At the decision node 1022, if the updates required modifying the e-service registered at the ESP 100 repository 305 (e.g., change of name, operating parameters, and the like), the appropriate data is transferred 1023 to the registered version; if there are no registration changes, the flow path ends.

Deletion of a service is naturally much simpler as depicted by FIG. 10D. When a deletion request is received 1025 from the provider-designer 105, it is expunged 1027, 1029 from both repositories 1005, 305.

Monitoring/Reporting

In the preferred embodiment, the CES 300 allows the Service Provider 105 to monitor the status of service executions (note that since any composite service is itself an e-service, monitoring features provided by CES are in addition to whatever mechanism is provided by the E-Service 303 platform for service monitoring). As examples, the CES 300 allows the Service Provider 105 to check how many instances of its composite service are in execution, at what stage they are in the execution (i.e., which path in the execution flow they have followed, which service is currently being invoked, what is the value of composite service data, and the like), or other characteristics that may be pertinent to any particular implementation.

Figure 1:
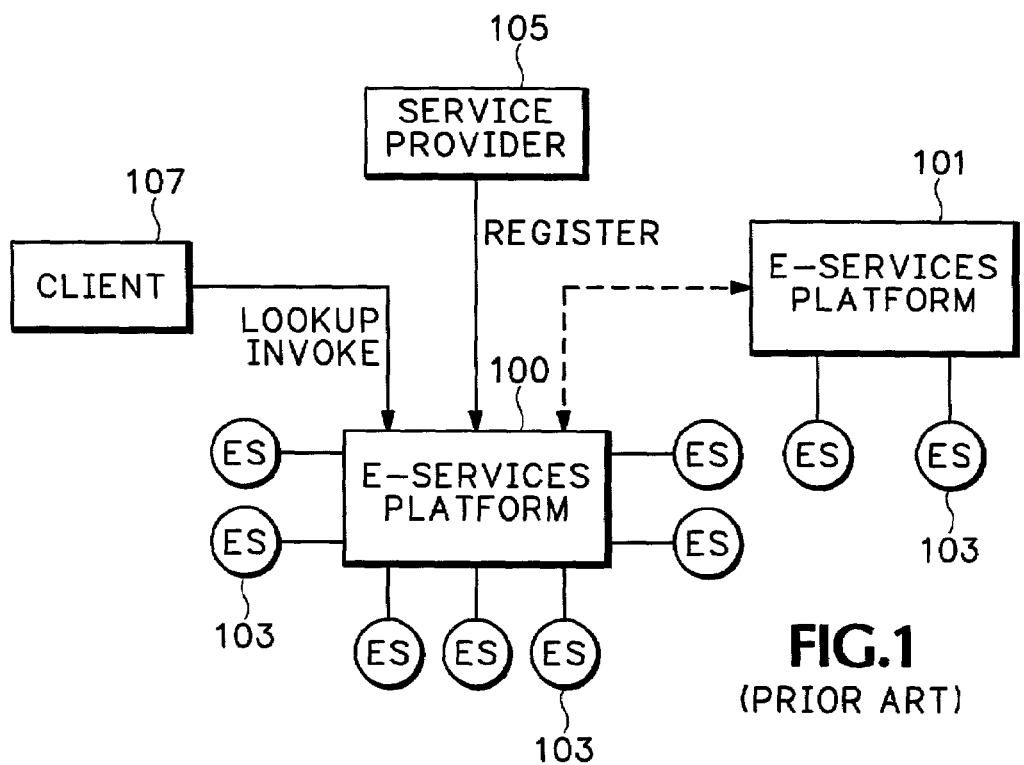
FIG. 1 (Prior Art) is a block diagram representative of an E-Service model.

In the preferred embodiment, E-Service 103 created by the CES 300 also includes method calls that allow Clients 107 to control service executions. More specifically, client users can pause, resume, and cancel a service execution. Note that while Service Providers 105 interact with the CES 300, Clients 107 of composite electronic-services only interact with the electronic-services through the service reference they got as a result of the lookup, as with a basic E-Service 103 (FIG. 1). The CES appropriately creates e-services that provide methods to control service executions. Also in the preferred embodiment, the CES itself provides a method to invoke and control the service executions.

Meta-Service

The CES 300 should be able to compose 1015 any service that is reachable through the ESP 100 to which the CES architecture interconnected (sometimes referred to in the art as "on top of"). Advanced ESPs 100, such as HP e-speak platforms, are capable of searching and accessing an E-Service 103, 303 delivered through ESPs 100 of different kinds, either natively or through gateways (as described in more detail hereinafter). Hence, the CES 300 conveniently employs the capability of the ESP 100 to access E-Services 103 running on top of heterogeneous ESP 100 platforms rather than re-developing the same interoperability features. In other words, the services that are invoked as part of the composite service can be on any ESP; moreover, the CES can be defined to compile both CSDL and non-CSDL specifications.

Composite Service Definition Language, CSDL

The present invention also provides a service composition model language; see also the Appendix hereto.

Figure 5:
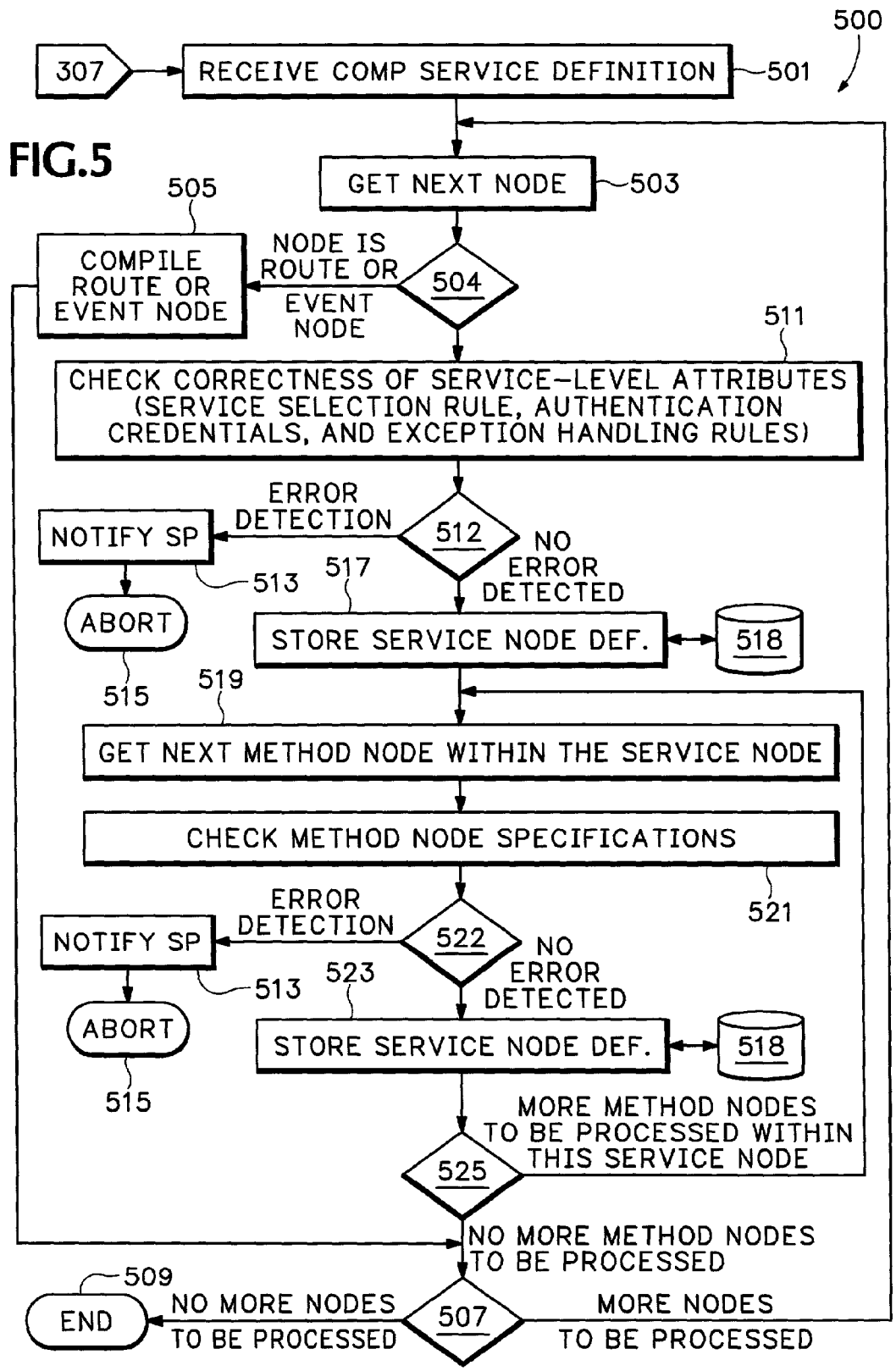
FIG. 5 is a flow chart of a Composition E-Service compilation process in accordance with the present invention as shown in FIGS. 2 and 3.

Turning to FIG. 5, and simultaneously referring also to FIG. 2, this compilation-registration methodology flow 500 is shown in more detail. The CES 300 (FIG. 3) receives the composite service definition data, step 501, in the form of a series of node specifications. Taking the first node, step 503, a determination, decision node 504, is made as to whether it is a decision-route node 115 or an event node 204. Whenever a decision-route node 115 or event node 204 is encountered, it is compiled, step 505, and the process then determines if there are more nodes to be processed or whether it was the last node, decision node 507. When the last service node 203 is processed, the compilation is finished 509, and the CES moves on to registering the E-Service (described hereinafter with respect to FIG. 6). As long as there are "More nodes to be processed," the flow loops back to taking the next node definition, step 503.

Assuming now that the current node is not a decision-route node 115 or an event node 204, but is a service node 203, the attributes of the data from the provider-designer 105 is verified, step 511. Whenever there is any "Error detected," as illustrated by decision-route node 512, the provider-designer 105 generating the definition is notified, step 513, and the compilation session is aborted, step 515. Once a current node definition 503 is verified, that definition is stored, step 517, in any known manner (depicted as memory stack 518).

As described above, a service node 203 can define a service-inherent method(s) or method flow (see FIG. 2, "Wheel delivery"). The CES 300 gets any "next" method node 205 within the current service node 203 just stored, step 519. The current method node specification under analysis, e.g., FIG. 2, method node 205, is verified, step 521, and when no error is found (decision-route node/step 522), appropriately stored in memory 518, step 523. A determination, decision-route node/step 525, is made as to whether there are more method nodes 205, 205' within the current service node 203, e.g., FIG. 2, "next" method node 205', and if so the flow loops back to retrieve 519, verify 521, and store 523 each such next method node. Once there are "No more method nodes 205, 205' to be processed" the determination step 507 as to whether there are "More nodes to be processed," looping back to retrieving the next node, step 503, or finishing the compilation, step 509. After compilation is successful, the composite service definition is transferred to the ESP 100 repository 305 (FIGS. 3 & 4).

Note that the CSDL language and system of the present invention for e-service composition has many different requirements with respect to traditional workflow architectures.

Figure 1A:
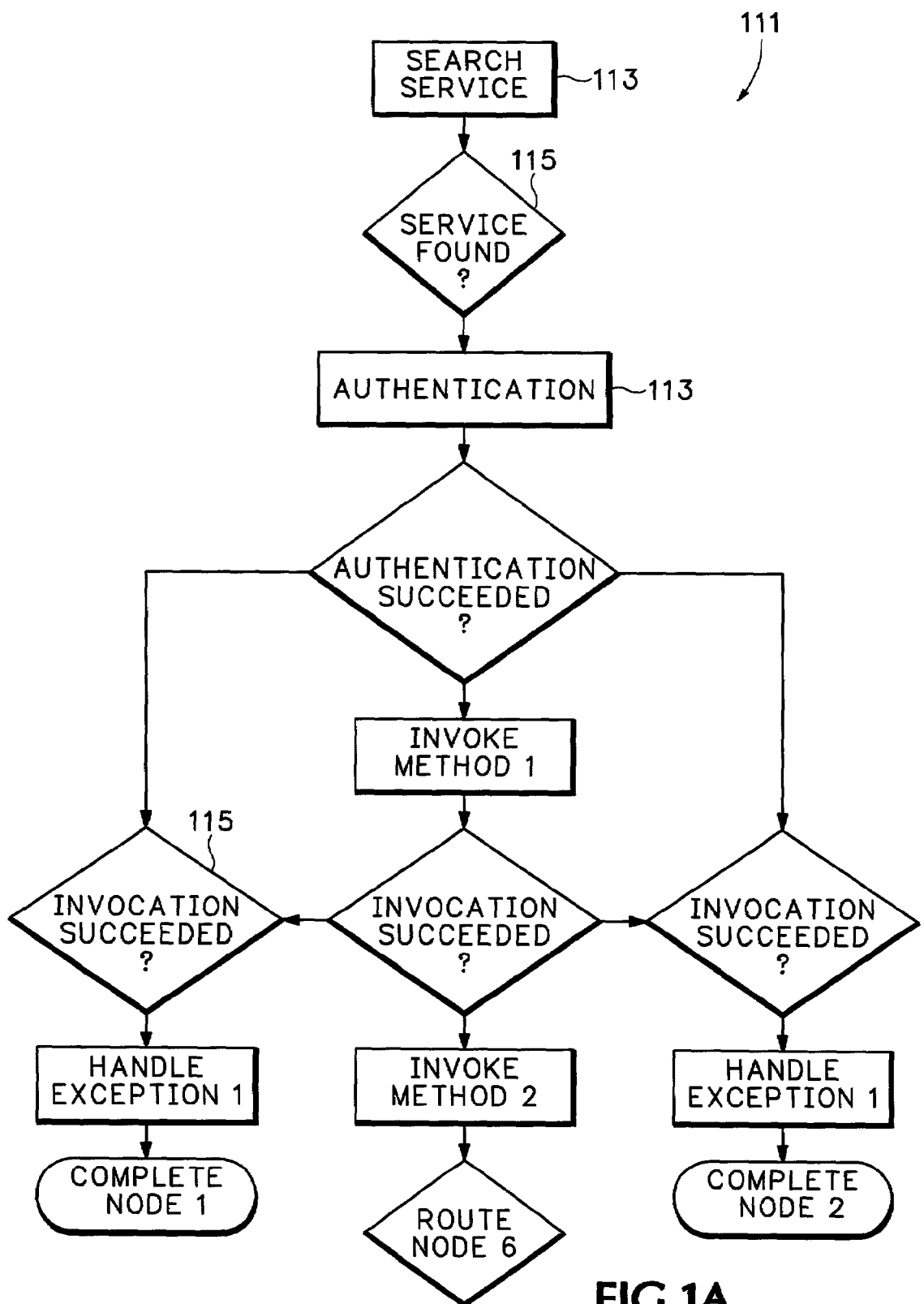
FIG. 1A (Prior Art) is a service process diagram.

A first difference should be recognized at the level of E-Service selection. Process nodes 113 in traditional workflow graphs as illustrated in FIG. 1A (Prior Art) represent administrative or production work items, assigned to human or automated resources. Often, workflow models also impose a resource model, based on roles and/or organizational model levels. Selecting a resource typically involves selecting an employee or an enterprise application by means of a resource language (possibly rich and expressive) that identifies authorized resources depending on the roles they play and on the level they belong to. On the other hand, service nodes 203 in an e-service environment as illustrated in FIG. 2 represent service invocations. As part of the service node 203 definition, the provider-designer 105 specifies the service to be invoked. Thus, the e-service environment has very different concepts and requirements from the traditional workflow architecture since there is typically no fixed "organizational model" or resource taxonomy. The E-Service 103, 303 is selected depending on its properties, and the selection criteria are specified in the query language supported by the E-Service Platform 100 (or, in general, by an e-service directory), which is usually quite powerful and flexible. The CSDL supports and facilitates the definition of service selection criteria for each node in the flow, allowing also criteria that depend on the specific instance in execution (i.e., are sensible to the instance-specific data, such as the customer name or geographical location). Following a traditional workflow approach (i.e., identify and classify electronic-services in advance and then specify work assignments through some role expression), is not required due to the presence of a substantially homogeneously created service repository 305 in the ESP 100 and of CSDL included service query and selection language. Therefore, note that besides not being required, the traditional workflow approach is also not advised as the e-service environment is very dynamic and electronic-services are introduced, modified, or deleted very often; without the present invention, the content and structure of the repository would have to be updated all the time were a traditional workflow approach employed.

A second difference can be recognized with respect to input and output data. In traditional workflows, input and output data are typically specified by a set of variable names; the semantics is that the value of the input variables at the time the node 113 is started is passed to the selected resource, and node execution results are inserted into the output variables. Communication between a WfMS and the resources is done through adapters, that understand the syntax and semantics of the data and perform the required data mappings. E-Services 103, depending on the ESP 100 on which they run, typically communicate in Java or XML format; these two languages dictate the rules and the syntax for data exchanges. Therefore, CSDL provides facility for processing Java and XML objects and transferring them to and from the invoked E-Service 103. Whereas in a traditional workflow approach there is a requirement to develop adapters that bridge the composition environment and each E-Service 103 to get rid of data mapping issues (at the cost of transferring the problem onto the adapters), in accordance with the present invention such adapters are eliminated. In fact, E-services 103 running on an ESP 100 share the same service model and parameter passing semantics, so that it is possible to take this into account in the CES 300 model 200 and provide facility for communicating with each of the E-Services 103 as composite pieces as prescribed by the ESP 100, thereby avoiding the need for adapters. This is a considerable advantage, given that developing adapters is difficult and tedious job, as demonstrated by the cost of commercial system integration platforms. In addition, it simplifies the use of the CES 300, since providers-designers may define and deploy a new composite service by simply sending a single file that includes all the business logic. There is no need of changing the configuration of several different systems, as it happens with traditional workflow architectures.

A third notable difference occurs with respect to consideration of the dynamic environment of e-commerce. Unlike "traditional" business processes, E-Services 103, 303 have to cope with a highly dynamic environment, where new services become available on a daily basis. In order to stay competitive, Service Providers 105 should offer the best available service in every given moment to every specific Customer 107. Clearly, it is unfeasible to continuously change a traditional workflow to reflect changes in the e-commerce business environment, since these occur too frequently whereas modifying the workflow architecture is a delicate and time-consuming activity (all spaghetti-like paths must be accounted for). Ideally, based on the modeling tool described hereinbefore, the CES 300 should be able to adapt transparently to changes in the e-commerce environment and to the needs of different customers 107 with minimal or no user intervention.

A fourth notable difference occurs with respect to the use of black boxes versus multi-methods interfaces. Typically, a work item in a traditional workflow represents the invocation of a business function. The work item is a black box from the workflow viewpoint. Instead, an E-Service 103, 303 may have several states and state transitions, caused by method invocations. Interacting with an E-Service 103, 303 requires operations to be performed at the service level (e.g., search and authentication) and operations to be performed at the method level (e.g., method invocations).

A fifth notable difference occurs at the level of security considerations. Current workflow technology has very little support for security. Often there is no encryption and access is controlled by means of user names and passwords. This is due to the genesis of WfMS as systems for managing the work in a restricted and controlled environment, generally within a corporation. In the Internet and e-service environment, the security requirements are different, and in particular E-Services 103, 303 may require the use of certificates, which therefore should be also supported by the service composition model and CSDL.

A sixth notable difference occurs because of the nature of business-to-business interactions. A number of standards (e.g., RosettaNet™, cXML, CBL) are being defined as industry standards or quasi-standards in order to support business-to-business interactions, possibly limited to specific, vertical markets (such as RosettaNet for the IT industry). Many applications that support such standards are being or have been developed, and it is likely that many service composition applications will interact with electronic-services that follow one of these standards. A CSDL must facilitate the composition of such electronic-services as well as their invocation, checking that the appropriate protocol is followed and that exceptions are thrown out when deviations from the protocol are recognized.

CSDL Definition

While CSDL reuses some of the conceptualizations developed by the WfMS provider community, it has several innovative features that make it suitable for e-service composition. CSDL has a two-level service composition model as described hereinbefore that distinguishes between invocation of electronic-services and of operations within a service. This is important since some aspects of the business logic are specific to a service and need to be specified at the service level, while others are instead specific to each method invocation, as detailed in the following:

(1) CSDL allows the definition of how to send XML documents as input to service invocations, and of how to map XML results into composite service data items; this is important since most of the interactions among E-Service 103, 303 occur in the form of XML documents;
(2) a flexible mechanism to handle certificates is provided, to enable the definition of which certificates should be sent to a service;
(3) a number of adaptive and dynamic features are provided, to cope with the rapidly evolving business and IT environment in which E-Service 103, 303 are executed;
(4) facilities for business-to-business interactions are provided in the form of service templates that can be reused by composite e-service providers-designers 105, so that they do not need to be concerned with technical details about the standard; and
(5) the entire business logic can be defined within a single XML document, thereby making easy and practical to provide and use composition as an e-service.

Operational Overview

A CES meta-service is described as a service that composes other basic or composite electronic-services. Such a metaservice solves the problems of advertising, discovering, delivering, managing, and protecting the novel e-service, providing end-to-end security, wherein the features provided by established ESPs 100 can be used. The availability of such a meta-service frees provider organizations from the need for maintaining a proprietary IT capability for e-service composition themselves (onerous to buy, install, and operate). In other words, the present invention also includes providing a metaservice of providing composition functionality as an e-service itself. The representations and implementation of applications according to an e-service platform framework or architecture creates the opportunity for composing individual, internet-accessible e-services that are offered by different companies into pre-packaged, value-added, composite e-services. A composite e-service can be textually specified by, for example, a known manner XML document. A composite e-service specification includes the definition of input, output, and local data items (sometimes also called flow variables). Input data items are parameters passed to the composite e-service at activation time. Output data items represent data returned to the caller at service completion. Input and output data items can also be used for routing purposes within composite e-service execution and for transferring data among service nodes 203. Local data items are neither input nor output, but are only used within the composite e-service to perform routing decision or to transfer data among nodes. The types of variables can be any basic Java type (e.g., String or Integer), a Java Vector, a generic Object, or an XML document. Each composite service instance has a local copy of the flow variables.

Security

Besides the flowchart as in FIG. 2 that defines the flow of service invocations, the definition of the composite e-service also includes security-related specifications. In particular, the definition of a composite e-service includes information about the authentication certificates (such as those defined by the X.509 industry standard) to be used throughout the flow within service invocations in cases the ESP 100 and the invoked e-service support or even require the use of digital certificates. By default, the CES 300 invokes component services with the privileges (i.e., the certificate) of the composite e-service provider-designer 105. However, the provider-designer 105 may specify that services should be invoked with the privileges of the composite e-service users, or with the privileges specified by the content of a flow variable (for instance, the certificate to be used may be passed to the composite service as one of its input parameters).

Service Nodes 203

Service nodes 203 represent invocations of a given service. The E-Service 103 to be invoked is specified by a search recipe, or service selection rules, defined in the query language supported by the ESP 100. As a service node 203 is started, the search recipe is executed, returning a reference to a specific service. Recipes can be configured according to the specific service instance in execution: every word in the search recipe that is preceded by a percentage sign "%" is expected to be a reference to a flow variable, and will be replaced by the value of that variable at the time the service node 203 is started. This allows the customization of the search recipe according to the value of flow variables. Note that different activations of a service node 203 may result in the selection of different e-services. However, sometimes the provider-designer 105 needs to specify a service node 203 that should reuse the same service invoked by another service node 203. The composition service model allows this by enabling the definition of a Service Reuse attribute, or service reuse clause, that includes the name of the service node 203 whose service reference is to be reused.

The definition of the service node 203 may include the certificate to be used when invoking the service's methods 207. The definition at the service level overrides the one done at the top level, i.e., composite service. Since it is assumed that all invocations on the same service will use the same certificate, there is no provision for the definition of a certificate at the method invocation level.

Flow of Method Invocations

E-Services 103, 303 in most ESP 100 models, will have an interface that allows several operations to be invoked on them. In order to achieve their goals, Clients 107 of these electronic-services will typically have to invoke several operations (i.e., call several methods) on the same service. Correspondingly, CSDL allows the provider-designer 105 to specify, within a service node 203, the flow of method invocations to be performed on a service. For instance, in accessing an e-music service, specifying a search for a given song (invoking the search method) and, if the price for the disc that includes the song is lower than a limit, then buying the whole disc (buyDisc method), otherwise simply download an mp3 file of that song only, paying the requested fee (BuySong method). To simplify both the language and the implementation, the method flow is specified with the same syntax (and semantics) of the top-level flow of electronic-services, with the only difference of concern being with the flow of method nodes 205, 205' instead of service nodes 203. If only one method needs to be invoked, then the provider-designer 105 needs not specify the flow structure, but only a single method node. In addition, CSDL allows the definition of service nodes 203 that have no method nodes 205, 205' inside. In fact, in a few cases, the provider-designer 105 might only want to execute a search recipe and get the results, possibly without invoking any method on the selected service. For instance, a node may simply need to get an e-service name, or other designator, in order to pass it to another e-service for handling.

Method Nodes 205, 205'

A method node (1) defines the method to be invoked on a service and its input data, (2) how to handle the reply (and specifically how to suitably map the reply message into flow variables), and (3) how to handle exceptions that may occur during the method invocation. The name of the operation to be invoked can be statically specified, or it can be taken from the value of a flow variable; for instance, specified by a string preceded by the percentage sign, %. The input data to be sent to the method are specified by a list of variable names or values. In case of variable names, the value of the variable at the time the node is started is sent as input to the method.

If a method invocation on a service returns a result (e.g., an integer or an XML document), then the provider-designer 105 needs to specify how information in the document can be extracted and inserted into flow variables. In case the method output is a Java object (basic or complex), then the mapping is simply specified by describing the name of the flow variable to which this value should be copied. For example, method "CheckCredit" node of FIG. 2 returns a Boolean value defining whether the credit check on the customer is positive or negative. In CSDL, this is defined as follows:

<Method-Output>
<Var-Mapping Flow-Var="Confirmation"/>
</Method-Output>.

Since it is likely that most of the output data will be a string containing an XML document, CSDL provides support for XML, and in particular it allows the provider-designer 105 to specify how fragments of the XML output document can be mapped into flow variables. A flow variable name assumes the value identified by an XSLT transformation or an XQL query on the output document. In the case of XQL queries, if the flow variable is of type XML, then the XQL query may actually return a set of elements, or a document. Otherwise, CSDL requires the query to identify a single element or attribute, or an exception is raised. For instance, the following mapping specifies that the XQL query:

customerList/customer[0] should be applied to the method output, and the result of the query should be put into variable "customer":

<Method Output>
<Var-Mapping Flow-Var="customer"
Conversion-Rule="customerList/customer[0]"
Rule-Type="XQL"/>
</Method Output>

The definition of the query may be static or may include references to flow variables, as usual preceded by the percentage sign. Note that an analogous approach can be used with any XML query and transformation language A Composition E-Service 300 Prototype.

This section presents a CES 300 prototype, for composing an HP e-speak E-Service 103, 303. The same design can however be adopted for any other ESP 100. The prototype is built as a higher level architecture of a commercial workflow engine (and specifically, for this embodiment, of HP Process Manager) that handles the execution of the flow. Note that using a commercial workflow engine does not rule out the possibility of developing a proprietary engine. FIG. 10, components of a CES prototype 301, showing also how the components of the prototype handle composite E-Service registrations.

A component of the CES architecture is the "gateway" 1001 that enables the interaction between a workflow engine 1003 and the ESP 100. The provided gateway 1001 performs appropriate mappings and implementations of CSDL semantics that is not supported by the workflow engine 1003, as discussed below.

The CES front-end responds to calls from Service Providers 105 and Clients 107 (even if the latter are unaware of the fact that they are communicating with the CES 300). When a Service Provider 105 registers a service, the CES front-end first translates the composite service definition(s) into the language of the selected workflow engine 1003. The translation generates a process where nodes correspond to method invocations on the ESP 100 or on the selected E-Service 103, 303. However, a service composition language can be richer than traditional workflow languages; thus, the translation can be a fairly complex procedure and may require the insertion of several "helper" nodes and data items that, in conjunction with the operations performed by the gateway 1001 (that has knowledge of the semantics of such helper nodes), enable the correct implementation of the CSDL semantics. Examples of issues to deal with in the translation include:

(1) mapping the two-level (service and method) model into a single-level one (in other words, the difference is that the user does not see the "spaghetti-like" workflow which is now managed by the CES, hiding the complexity from the user) and (2) rewriting the input and output data items of nodes so that they can have all the information required to build XML documents and to map back XML replies into process data.

Consider, for example, the single problem of mapping the CSDL two-level service model into a traditional workflow model. In order to map a service node 203, we need to insert a node that implements the search recipe (i.e., sends the service selection query to the ESP 100), and to define the data items needed for storing and sending certificate information. In addition, different method invocations occur in the context of the same session with the e-service. Hence, we need to define and properly initialize process data items that can carry session identifications from node-to-node. Note that this problem could not have been solved by simply defining a subprocess, both because the need for defining service selection nodes and certificate nodes still remain, and because nodes in a subprocess do not have access to the variables of the main process (unless they are passed as input parameters, but even in that case the parameters are passed by value and not by reference). Where it is not possible to map appropriately, part of the semantics is encoded in the gateway 1001; for instance, XQL queries are performed by the gateway 1001. The gateway 1001 is also in charge of replacing references to flow variables in XML documents (i.e., those items preceded by the "%" symbol) with the actual value.

Figure 11:
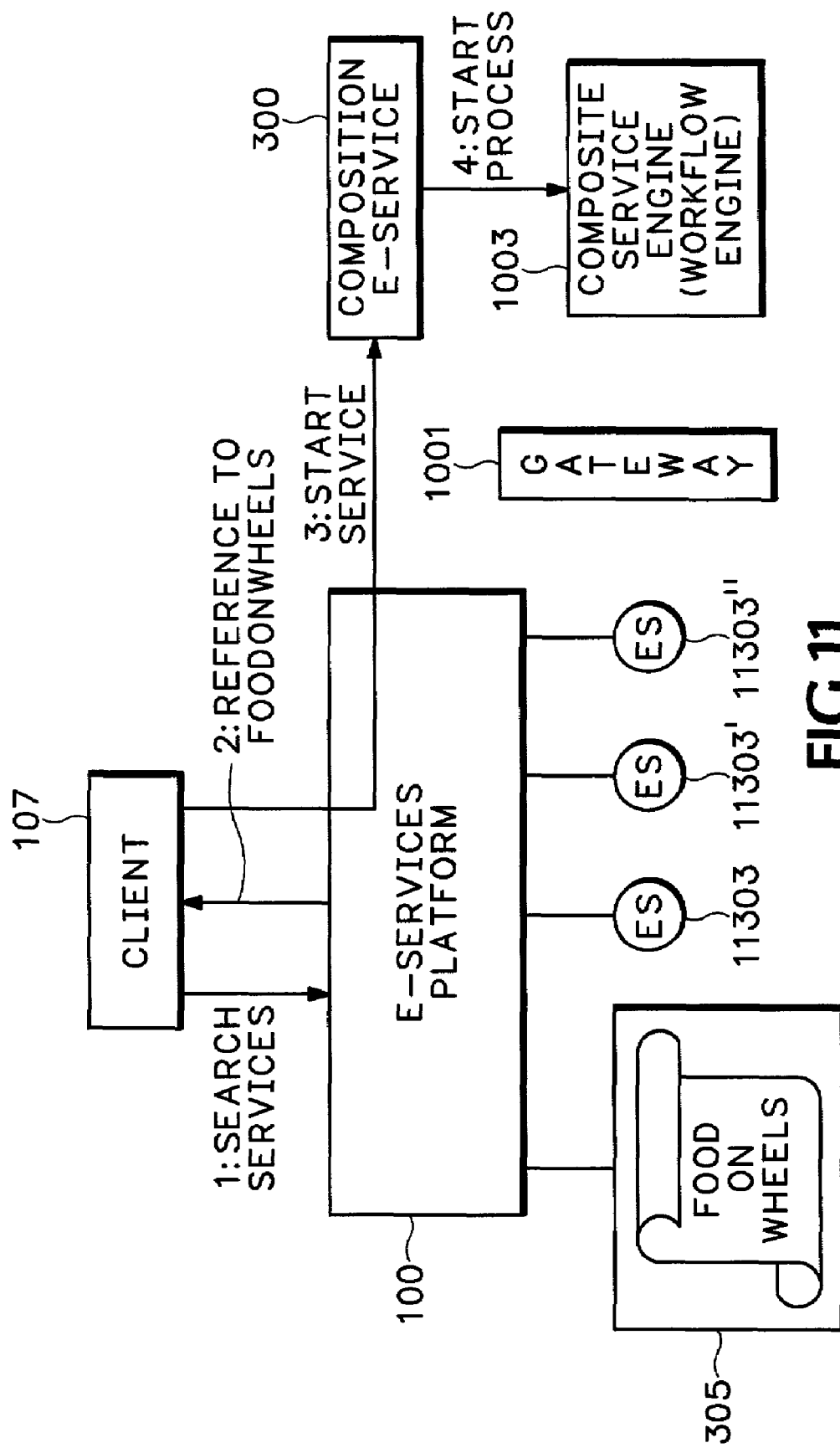
FIG. 11 is a block diagram of invocation of composite services using the prototype as shown in FIG. 10.

After the mapping has been completed and the process is installed on the workflow engine 1003, the CES 300 registers the new service (e.g., "FoodOnWheels" 303) with the HP e-speak ESP 100. As FIG. 10 shows, the CES 300 itself is the handler for the newly registered service. However, this does not change the validity of the scenario depicted in FIGS. 2 and 8. As shown in FIG. 11, Clients 107 simply communicate with the E-Service(s) 11303, 11303', 1303" through the reference they get on their browser; they are not concerned with how the service is implemented on the server side. When a Client 107 invokes a composite service, the CES 300 starts the corresponding process in the flow system (the mapping between the composite e-service name and the process name is defined at registration time and stored within the CES). Activities in the flowchart 200 include method invocations 207 on a given service involved in the composition. From a flow perspective, all activities are assigned to the gateway 1001. The gateway 1001 receives indication of what to do by the workflow engine 1003 as part of the activity definition, along with data items that provide (a) context information about the service on which method calls are being or have to be placed (e.g., service references, search recipes, certificates, and mapping information to process the XML document returned by the method and update the value of flow variables) and (b) the value of the parameters to be passed as part of the method invocation. When the gateway 1001 receives work by the engine 1003, it activates a new thread in order to process the work. The thread waits for the reply from an E-Service 11303, 11303', 11303", executes the mapping rules, and sends the results back to the engine. All the state information is maintained by engine, and the gateway 1001 does not persist anything (this choice is motivated by the fact that the engine logs all state changes, so there is no need for a persistent gateway).

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . "and no process step herein is to be construed under those provisions unless the step or steps are expressly recited using the phrase "comprising the step(s) of . . . "

What is claimed is:

1. An electronic meta service methodology comprising:
   receiving a process definition;
   transforming the process definition into a composite process specification in a format supported by an electronic services platform, said composite process specification having a plurality of electronic services;
   registering the composite process specification with the electronic services platform; and
   associating each of a plurality of service nodes with a sequential set of method nodes, wherein each sequential set of method nodes includes invocations of inherent operations associated with an associated one of said electronic services.

2. The methodology as set forth in claim 1, said transforming further comprising:
   determining which elements of the process definition constitute specific electronic services and designating said elements as linked said service nodes of a continuous flow defining said composite process specification.

3. The methodology as set forth in claim 2 wherein said designating comprises:
   configuring each of said service nodes with service invocation setup requirements for an associated one of said electronic services.

4. The methodology as set forth in claim 1, said registering further comprising:
   establishing a repository of defined composite electronic services.

5. The methodology as set forth in claim 4, said transforming further comprising:
   using said defined composite electronic services in said repository for configuring other composite electronic services.

6. The methodology as set forth in claim 1 said receiving further comprising:
   receiving said process definition as a process flow language for composing e-services.

7. The methodology as set forth in claim 1 further comprising:
   providing ancillary functions selected from a group including: changing the process, managing individual electronic service definitions, monitoring run-time executions, and obtaining analytical-statistical reports regarding said process.

8. The methodology as set forth in claim 1 further comprising:
   allowing service providers to invoke a composite process defined by said composite process specification as an individual electronic service via said electronic services platform.

9. The methodology as set forth in claim 1 in an internet environment.

10. The methodology as set forth in claim 1 wherein at least one electronic service is an electronic services platform.

11. The methodology as set forth in claim 1 wherein said at least one electronic service is an electronic service directory.

12. A computerized system for creating composite electronic services for an electronic service platform comprising:

a computer processor;

a memory:

computer code for receiving a process definition;

computer code for transforming the process definition into a composite process specification in a format supported by an electronic services platform, said composite process specification having a plurality of electronic services;

computer code for registering the composite process specification with the electronic services platform; and computer code for associating each of a plurality of service nodes with a sequential set of method nodes, wherein each sequential set of method nodes includes invocations of inherent operations associated with an associated one of said electronic services.

13. The system as set forth in claim 12, said computer code for transforming further comprising:

computer code for determining which elements of the composite process constitute specific electronic services, and computer code for designating said elements as linked service nodes of a continuous flow defining said composite process.

14. The system as set forth in claim 13 wherein said computer code for designating comprises:

computer code for configuring each of said service nodes with service invocation setup requirements for an associated one of said electronic services.

15. The system as set forth in claim 12, said computer code for registering further comprising:

computer code for establishing a repository of defined composite electronic services with said electronic services platform.

16. The system as set forth in claim 15, said computer code for transforming further comprising:

computer code for using said defined composite electronic services in said repository for configuring other composite electronic services.

17. The system as set forth in claim 12 wherein system designers of said composite electronic services are provided with a Composite Service Definition Language format specification and said computer code for receiving said process definition is pre-structured for said a Composite Service Definition Language format.

18. The system as set forth in claim 12 further comprising:

computer code for providing ancillary functions selected from a group including: changing the process, managing individual electronic service definitions, monitoring run-time executions, and obtaining analytical-statistical reports regarding said process.

19. The system as set forth in claim 12 further comprising:

computer interface code for allowing service providers to invoke said composite process as an individual electronic service via said existing electronic services platform.

20. An electronic business system for an electronic services platform environment, the electronic business system comprising:

means for receiving a specification of a first electronic service;

means for compiling other existing secondary electronic services into the first electronic service;

means for structuring said first electronic service to be compatible with a given electronic services platform; and means for registering said first electronic service in the electronic services platform environment means for associating each of a plurality of service nodes with a sequential set of method nodes, wherein each sequential set of method nodes includes invocations of inherent operations associated with an associated one of said electronic services.

21. The system as set forth in claim 20 further comprising: means for defining said specification.

22. The system as set forth in claim 20 further comprising: means for forming a repository of a plurality of electronic services of a type of said first electronic service.

23. The system as set forth in claim 20 further comprising: means for providing a work flow representative of said first composite electronic service such that said work flow is compatible with said electronic services platform structure.

24. The system as set forth in claim 23 further comprising: means for providing an interaction gateway between said means for providing a work flow and said electronic services platform.

25. The system as set forth in claim 20 further comprising: means for monitoring said first electronic service.

26. The system as set forth in claim 20 further comprising: means for maintaining said first electronic service.

27. The system as set forth in claim 26, said means for maintaining further comprising:

means for updating said first electronic service after registration with said electronic services platform.

28. The system as set forth in claim 26, said means for maintaining further comprising:

means for deleting said first electronic service from registration with said electronic services platform.

* * * * *

UNITED STATES PATENT AND TRADEMARK OFFICE
CERTIFICATE OF CORRECTION

PATENT NO. : 7,222,334 B2  Page 1 of 1
APPLICATION NO. : 09/911916
DATED : May 22, 2007
INVENTOR(S) : Fabio Casati et al.

It is certified that error appears in the above-identified patent and that said Letters Patent is hereby corrected as shown below:

On the title page, item (73), in "Assignee", in column 1, line 2, delete "Comapny" and insert -- Company --, therefor.

In column 3, line 1, delete "service" before "is a".

In column 17, line 12, delete "1303"" and insert -- 11303" --, therefor.

In column 19, line 2, in Claim 12, after "memory" delete ":" and insert -- ; --, therefor.

In column 19, line 21, in Claim 13, after "linked" insert -- said --.

Signed and Sealed this

Twenty-eighth Day of April, 2009

JOHN DOLL
*Acting Director of the United States Patent and Trademark Office*